(12) United States Patent
Holle

(10) Patent No.: US 12,064,911 B2
(45) Date of Patent: Aug. 20, 2024

(54) METHOD AND DEVICE FOR MEASURING A TUBULAR STRAND

(71) Applicant: Sikora AG, Bremen (DE)

(72) Inventor: Armin Holle, Achim (DE)

(73) Assignee: Sikora AG, Bremen (DE)

( * ) Notice: Subject to any disclaimer, the term of this patent is extended or adjusted under 35 U.S.C. 154(b) by 934 days.

(21) Appl. No.: 16/977,227

(22) PCT Filed: Feb. 26, 2019

(86) PCT No.: PCT/EP2019/054703
§ 371 (c)(1),
(2) Date: Dec. 30, 2020

(87) PCT Pub. No.: WO2019/166420
PCT Pub. Date: Sep. 6, 2019

(65) Prior Publication Data
US 2021/0114278 A1 Apr. 22, 2021

(30) Foreign Application Priority Data
Mar. 1, 2018 (DE) ...................... 10 2018 104 705.3

(51) Int. Cl.
*B29C 48/92* (2019.01)
*B29C 48/90* (2019.01)
(Continued)

(52) U.S. Cl.
CPC ............ *B29C 48/92* (2019.02); *B29C 48/903* (2019.02); *G01B 15/02* (2013.01); *G01B 15/04* (2013.01);
(Continued)

(58) Field of Classification Search
None
See application file for complete search history.

(56) References Cited

U.S. PATENT DOCUMENTS

| 4,304,995 A | 12/1981 | Paavo et al. |
| 5,760,413 A | 6/1998 | Kurachi et al. |

(Continued)

FOREIGN PATENT DOCUMENTS

| DE | 3729743 A1 | 3/1989 |
| DE | 102015110600 B3 | 12/2016 |

(Continued)

OTHER PUBLICATIONS

KR 10-202-7027560; filed Feb. 26, 2019; Korean Office Action dated Sep. 9, 2021 (10 pages).

(Continued)

*Primary Examiner* — Edwin C Gunberg
(74) *Attorney, Agent, or Firm* — Barclay Damon LLP

(57) ABSTRACT

A method for measuring a tubular strand exiting from an extrusion device comprises directing electromagnetic radiation from an inside of the tubular strand to an inner side of a tubular strand. The electromagnet radiation is radiated from at least one radiation source within a frequency range from 1 GHz to 6000 GHz. The electromagnetic radiation is reflected off of the tubular strand and received by at least one radiation receiver. A value for at least one of a diameter, a wall thickness, and a deviation in shape of the tubular strand is determined from the electromagnetic radiation received by at least one radiation receiver.

27 Claims, 2 Drawing Sheets

(51) Int. Cl.
    *B29L 23/00*     (2006.01)
    *B29L 31/00*     (2006.01)
    *G01B 15/02*     (2006.01)
    *G01B 15/04*     (2006.01)

(52) U.S. Cl.
    CPC ........... *B29C 2948/92123* (2019.02); *B29C 2948/92152* (2019.02); *B29C 2948/92171* (2019.02); *B29C 2948/92447* (2019.02); *B29C 2948/92857* (2019.02); *B29L 2023/00* (2013.01); *B29L 2031/731* (2013.01)

(56) References Cited

U.S. PATENT DOCUMENTS

| | | | |
|---|---|---|---|
| 5,895,927 | A | 4/1999 | Brown |
| 10,281,318 | B1* | 5/2019 | Lawrence ............. G01N 9/24 |
| 2010/0123467 | A1 | 5/2010 | Andarawis et al. |
| 2011/0168900 | A1* | 7/2011 | Dobbs ................. G01M 11/00 250/360.1 |
| 2015/0212060 | A1* | 7/2015 | Van Mechelen ....... G01N 21/55 250/338.1 |

FOREIGN PATENT DOCUMENTS

| | | |
|---|---|---|
| DE | 102015122205 A1 | 6/2017 |
| DE | 102016109087 A1 | 11/2017 |
| JP | 2000-508263 A | 7/2000 |
| WO | 8707364 | 12/1987 |
| WO | 2015074642 A1 | 5/2015 |
| WO | 2016139155 A1 | 9/2016 |

OTHER PUBLICATIONS

KR 10-202-7027560; filed Feb. 26, 2019; English translation of Korean Office Action dated Sep. 9, 2021 (12 pages).

JP 2020-544597; filed Feb. 26, 2019; Japanese Office Action dated Oct. 26, 2021 (4 pages).

J. Hauck et al.; Terahertz Inline Wall Thickness Monitoring System for Plastic Pipe Extrusion; AIP Conference Proceedings 1593, 86 (2014); doi: 10.1063/1.4873740; On or before Dec. 31, 2014; AIP Publishing (5 pages).

\* cited by examiner

METHOD AND DEVICE FOR MEASURING A TUBULAR STRAND

CROSS REFERENCE TO RELATED INVENTION

This application is a national stage application pursuant to 35 U.S.C. § 371 of International Application No. PCT/EP2019/054703, filed on Feb. 26, 2019, which claims priority to, and benefit of, German Patent Application No. 10 2018 104 705.3, filed Mar. 1, 2018, the entire contents of which are hereby incorporated by reference.

BACKGROUND

The invention relates to a method and a device for measuring a tubular strand exiting from an extrusion device.

In extrusion devices, for example plastic that is supplied granulated is melted, and the flowable plastic is discharged as a tubular strand through an annular gap. Then the tubular strand enters into a calibration device with a calibration sleeve, against the inner surface of which the tubular strand is pressed for example by applying a vacuum (vacuum tank). Subsequently, the tubular strand passes through a cooling section in which the outside of the strand is sprayed with a cooling liquid, such as for example cooling water.

It is desired to ascertain early on certain geometric parameters of the tubular strand such as the diameter, wall thickness or deviations from the given shape in order to correctively intervene in the extrusion process on this basis.

A method and a device for measuring the diameter and/or the wall thickness of a strand by means of terahertz radiation is known from WO 2016/139155 A1. By means of a radiation transmitter, terahertz radiation is directed toward the strand to be measured, and terahertz radiation reflected by the strand is received by a radiation receiver. An evaluation apparatus can for example ascertain geometric parameters such as the diameter or wall thickness of the strand based on runtime measurements.

A method is known from DE 10 2016 109 087 A1 for regulating and controlling tubular extrusion systems in which the diameter, the wall thickness, any deviations in shape and the sag of the molten tube are ascertained at several points between the extrusion die and the subsequent calibration device, and these measured values, or respectively the data calculated therefrom, are used to regulate and control the extrusion system. For measuring, several measuring sensors are arranged distributed over the outer circumference of the molten tube in an intermediate region between the extrusion system and the calibration device. In addition to the aforementioned measuring methods, it is also known to measure geometric parameters of a tubular strand using ultrasonic sensors.

With the method described in DE 10 2016 109 087 A1, faster intervention in controlling the extrusion system upon detecting undesirable geometric deviations is supposedly possible in that the measuring sensors measure the tubular strand from the outside after exiting the extrusion system and before entering the calibration device. A disadvantage in the known method is however that, before entering the calibration device, the tubular strand can still deviate significantly from its specific final geometry in the calibration device. The measured values ascertained using the known method can therefore be fraught with corresponding imprecisions. Measuring using the known measuring method after the tubular strand exits the calibration device, i.e., when the tubular strand is again accessible to be measured from the outside, does in fact ensure that the measured geometric values are then closer to the final geometry of the strand. However, such regulatory interventions in the extrusion system made on the basis of such late measured values result in significant scrap arising in the interim. Moreover, measuring using the known method in the region of the cooling section is problematic because of the cooling liquid applied there to the outside of the strand as mentioned. Accordingly, especially measurement using terahertz radiation is impaired by cooling liquid located in the measuring path.

Another problem of the known measuring method is the defocusing effect of the strand's outer surface. This can cause the radiation directed toward the strand's outer surface to return to the radiation sensor only with a significantly reduced signal intensity after being reflected from the strand. Particularly in the case of strands of a great wall thickness or with a strongly absorbing material, this constitutes a major problem since correspondingly large radiation absorption is associated with great wall thicknesses, or respectively strongly absorbing material. Moreover, it is frequently desired to ascertain the aforementioned geometric parameters at several measuring points distributed over the circumference of the strand. To accomplish this, a plurality of sensors must be arranged distributed over the circumference in the known method, wherein they must be arranged in a precise circular path for precise measuring results. This represents a significant problem given the existing harsh operating conditions in practice. Finally, the known method requires significant additional installation space, especially for tubular strands of a large diameter, because of the radiation sensors to be provided. Moreover, for technical reasons, extrusion systems are preferably designed so that the path between an annular gap at the extruder head and the calibration sleeve is as small as possible. This yields very limited space conditions. Furthermore, the extrudate between the annular gap and calibration sleeve is typically not oriented perfectly orthogonal to a sensor, particularly in the initial phase where sagging frequently occurs. This can cause signal loss.

On the basis of the explained prior art, the object of the invention is to provide a method and a device of the aforementioned type by means of which geometric parameters of extruded, tubular strands can be ascertained as early as possible after extrusion in a precise manner requiring little installation space.

BRIEF SUMMARY OF THE INVENTION

For a method of the aforementioned type, the invention achieves the object in that electromagnetic radiation from at least one radiation source within a frequency range of 1 GHz to 6000 GHz is directed from the inside to the inner side of the tubular strand, electromagnetic radiation reflected by the tubular strand is received by at least one radiation receiver, and the diameter, and/or the wall thickness, and/or the deviations in shape of the tubular strand are ascertained from the received electromagnetic radiation.

In an embodiment, at least one radiation source is provided for electromagnetic radiation within a frequency range of 1 GHz to 6000 GHz that is arranged such that electromagnetic radiation that it emits from the inside is directed toward the inner side of the tubular strand, furthermore at least one radiation receiver is provided for receiving electromagnetic radiation reflected by the tubular strand, and an evaluation apparatus is provided which is designed to ascertain the diameter, and/or the wall thickness, and/or the deviations in shape of the tubular strand from the received electromagnetic radiation.

The tubular strand measured according to the invention is an in particular hollow cylindrical plastic strand exiting from an extrusion device. The tubular strand can possess an outer diameter of more than 1 meter. This is associated with correspondingly great wall thicknesses. The invention is fundamentally based on the measuring principle already described in the prior art in which electromagnetic radiation is directed from a radiation source toward the tubular strand, and radiation reflected therefrom is received by a radiation receiver. In an embodiment, electromagnetic radiation within a frequency range of 1 GHz to 6000 GHz is used. An advantage of radiation within this frequency range is that, in contrast to for example laser radiation within the visible frequency range, it is largely insensitive to external influences such as those occurring during extrusion processes. For example, based on runtime measurements, geometric parameters such as the outer diameter, wall thickness and/or deviations from the given, e.g., circular cylindrical shape can therefore be ascertained in a manner known per se. In a particularly practical manner, the radiation source and radiation receiver can be integrated in a component as a so-called transceiver. To ascertain the wall thickness, electromagnetic radiation is used within a wavelength range for which the extruded strand is at least partially transparent.

In contrast to the prior art, according to the invention the electromagnetic radiation from the at least one radiation source is directed not from the outside, but rather from the inside to the inner side of the tubular strand. Part of the electromagnetic radiation is correspondingly first reflected from the inner surface of the strand and then returns to the radiation receiver which, as explained, can form a common component with the radiation source. Another part of the electromagnetic radiation penetrates into the wall of the tubular strand and is reflected by the outer surface of the tubular strand. This radiation component reflected from the outer surface also returns to the radiation receiver. For example, the wall thickness of the strand can be ascertained from a difference in runtime between the described radiation components. Moreover, for example when transmitting the electromagnetic radiation to the inner side of the tubular strand starting from the longitudinal axis of the strand, the radius and correspondingly the diameter of the strand can be determined from a runtime measurement of the radiation component reflected by the outer surface of the strand. If a measurement according to the invention is carried out for example at various measuring points distributed over the inner circumference of the strand, a deviation in diameter at different measuring points can also be ascertained from the particular runtime measurement, and therefore a deviation in the outer diameter or the inner diameter of the strand from a given shape, in particular a circular shape, i.e. for example, an ovality.

Significant advantages over the prior art are realized by measuring according to the invention from the inner side of the tubular strand. The curvature of the strand inner wall has a focusing effect on the emitted radiation so that the radiation receiver always receives a high signal intensity, even with great wall thicknesses. From an optical perspective, this arrangement is optimum in comparison to the described prior art measurement from the outside. Since the measuring sensors are arranged in the inner region enclosed by the tubular strand, the region around the outer circumference of the strand remains free. Firstly, this can significantly reduce the required installation space, which is important in particular with strands of a great diameter. Moreover, measuring according to the invention can also occur in a region in which the outer surface of the tubular strand is covered, for example by a metal calibration sleeve of a calibration device. In contrast to the prior art, it is therefore unnecessary to measure in a free region between the extrusion system and calibration device in which the tubular strand can still deviate strongly from its final geometry. Instead, according to the invention, the tubular strand that has already entered into the calibration device, in particular a calibration sleeve, can also be measured, so that geometric parameters are already determined that are clearly specified by the calibration sleeve and are at least close to the final geometric parameters. Measurements of for example the wall thickness of the strand therefore already provide very clear information as to how the wall thickness is distributed over the circumference, and whether this corresponds to the distribution required for the production process. Moreover, this calibration sleeve can directly adjoin the extrusion device so that directly after the tubular strand exits the extrusion device, measured values are available for controlling, or respectively regulating the extrusion system. Scrap can be correspondingly minimized. At the same time, it is possible to reliably determine the described geometric parameters at any time.

Another advantage of the invention is that the gravimetry normally to be provided in the prior art may be entirely omitted in certain circumstances, or the gravimetry may only be redundantly necessary. Accordingly, due to the reliably ascertained measured values according to the invention and given a known line speed of the extrusion device, the amount of material used during extrusion may be directly inferred.

It is possible to provide a positioning apparatus, in particular for positioning within a plane perpendicular to the longitudinal axis of the tubular strand, for the at least one radiation source, or respectively the at least one radiation receiver, in particular the at least one transceiver. In this manner, the position of the transceiver can be precisely adjusted, which further enhances precise measurement of the geometry. Furthermore, it can be advantageous to provide a protective cover that reflects infrared radiation but however lets electromagnetic radiation pass through that is used for measurement in order to reduce thermal irradiation of the at least one radiation source and/or the at least one radiation receiver. A temperature-resistant glass pane correspondingly coated with a broadband infrared reflective layer would be conceivable. Such a protective pane simultaneously serves as protection from soiling.

It is furthermore possible to provide a temperature sensor for measuring the temperature of the tubular strand at least one measuring region on the inner circumference of the tubular strand. The temperature of the strand can be important for controlling the extrusion process. Pyroelectric Infrared (PIR) sensors, also referred to as Passive Infrared sensors are for example possible. The at least one temperature sensor can deliver its measured values as a function of the location, for example as a function of an angle of rotation of a rotating temperature sensor.

Moreover, at least one spatially resolving camera can be provided for recording the inner surface of the tubular strand. The image of the surface, or respectively the surface structure of the extruded material can also be helpful as a measured value in order to control, or respectively regulate the extrusion process in a suitable manner. In this manner, imperfections of the inner surface can be identified early on and possibly eliminated by changing the extrusion parameters. For example, a line scan camera is possible as a spatially resolving camera which possibly may rotate together with the at least one radiation transmitter and/or the at least one radiation source. A lighting apparatus can additionally be assigned to the spatially resolving camera which illuminates the inner surface of the strand. Depending on the properties to be determined, illumination can be in visible white light, in infrared light, or also in UV light.

According to one embodiment, the extrusion device can be controlled and/or regulated on the basis of the ascertained values for the diameter, and/or wall thickness, and/or shape deviations. As explained above, the measuring arrangement according to the invention allows particularly fast controlling, or respectively regulation of the extrusion process, and therefore a minimization of scrap.

According to another embodiment, the at least one radiation source and/or the at least one radiation receiver can be arranged in the interior of the tubular strand. It can moreover be provided that the at least one radiation source and/or the at least one radiation receiver is supplied with electrical energy, data and/or with a coolant through at least one supply line running out of an extruder head of the extrusion device to the at least one radiation source, and/or at the least one radiation receiver. In particular, data transmission can of course also be bidirectional. This embodiment is particularly useful for large tubular strands that offer sufficient space in the interior for the at least one radiation source and the at least one radiation receiver, in particular at least one transceiver. Generally, the extruder head has a screw rotatably driven by a shaft with which the plasticized plastic material is discharged from the extruder head through an annular gap to form the tubular strand. If the radiation source and/or the radiation receiver are arranged in the interior of the tubular strand, there can correspondingly be an electrical supply and/or a supply with a coolant such as a cooling liquid through the extruder head directly into the interior of the tubular strand. For example, at least one supply line in this regard can exit the extruder head in the longitudinal direction of the extruded strand into the interior of the strand. The at least one supply line can run for example through a central shaft of the extruder head surrounded by an extruder screw. Alternatively to such an electrical supply or coolant supply, it would in principle also be conceivable for there to be a supply from batteries and/or cooling elements such as Peltier elements.

According to another embodiment, it can be provided for the at least one radiation source and/or the at least one radiation receiver to be arranged outside of the tubular strand, and for radiation emitted by the at least one radiation source to be directed through at least one radiation conductor into the interior of the tubular strand, and for the radiation reflected by the tubular strand to be directed through at least one radiation conductor out of the interior of the tubular strand to the at least one radiation receiver. This embodiment is particularly quite useful for strands with a comparatively small diameter in which there is little room available in the interior of the strand. Moreover, the at least one radiation source and the at least one radiation receiver are thereby effectively protected from high temperatures and other impairments. Hollow conductors are for example possible as the radiation conductor.

According to another embodiment, the at least one radiation conductor can run out of an extruder head of the extrusion device into the interior of the tubular strand. It is moreover possible for the radiation conductor to run on the extruder head in the longitudinal direction of the extruded tubular strand into the interior of the strand. For example, the radiation conductor can also run through a central shaft of the extruder head surrounded by an extruder screw.

According to another embodiment, the electromagnetic radiation can be directed to the inner side of the tubular strand starting from the longitudinal axis of the tubular strand, and/or perpendicular to the longitudinal axis of the tubular strand. Such direction of the radiation starting from the center of the strand permits a determination of the diameter even if only a single measuring point is provided.

According to another embodiment, the electromagnetic radiation can be directed to several measuring regions of the inner side of the tubular strand distributed over the inner circumference of the tubular strand. The precision of determining the geometry can thereby be increased. For example, measuring could occur at least 20 measuring regions, or respectively measuring points, preferably at least 50 measuring regions, or respectively measuring points distributed over the inner circumference of the tubular strand.

According to another embodiment, the electromagnetic radiation can be directed to the inner side of the tubular strand by at least one radiation transmitter arranged in the interior of the tubular strand and rotating about the longitudinal axis of the tubular strand. In this manner, a plurality of measuring points can be provided distributed over the inner circumference of the strand. In contrast to rotation over the outer circumference of the strand, a significantly more precise and temperature-stable circular path of rotation occurs in principle with the arrangement according to the invention in the interior of the strand, in particular in the center of the strand, which in turn supplies more precise measured values. In addition, a radio link is unnecessary with continuous rotation. Instead, reliable slip ring arrangements are also available for data transmission with a central attachment in the strand interior. Beyond the measuring head with a radiation transmitter and if applicable radiation receiver, no additional electronics then have to be placed in the interior of the strand. Drives for a described rotary movement are designed simple and robust.

The at least one radiation transmitter can be the at least one radiation source. Beyond the at least one radiation source, the at least one radiation receiver can also be correspondingly arranged in the interior of the strand, wherein they can rotate together. For example, at least one rotating transceiver can be provided.

It is alternatively also possible for the at least one radiation transmitter arranged in the interior of the tubular strand to be at least one mirror irradiated by the at least one radiation source and rotating about the longitudinal axis of the tubular strand. The at least one radiation source and if applicable the at least one radiation receiver as well can be protected in this embodiment and arranged outside of the strand when there is little installation space. Only the rotating mirror must be arranged in the interior of the strand. For example, it deflects by 90° to the inner surface of the strand the electromagnetic radiation guided into the strand's interior by a radiation conductor in the longitudinal direction of the strand. Depending on the rotary position of the mirror, the entire inner circumference of the strand can be covered and measured. The radiation reflected back by the strand is then guided by the rotating mirror into the radiation conductor and back to the radiation receiver.

According to an embodiment, electromagnetic radiation within a frequency range of 10 GHz to 3000 GHz, preferably within a frequency range of 20 GHz to 1000 GHz can be used as the electromagnetic radiation. Such terahertz radiation is particularly well-suited for the measurement according to the invention. It is largely insensitive to outside influences. Pulsed or frequency-modulated continuous wave radiation (FMCW radiation) can for example be used.

According to another embodiment, the measured part of the tubular strand can be located in a calibration device following the extrusion device during measurement. As explained above, such calibration devices frequently have hollow cylindrical calibration sleeves against which the extruded strand is pressed in a still-soft state, for example by applying a vacuum (vacuum tank). On the one hand, this prevents the still-flowable strand from collapsing. On the other hand, the desired diameter of the strand and its outer shape is specifically dictated by the calibration sleeve. The calibration device, in particular the calibration sleeve, can directly adjoin an extruder head of the extrusion device. It is therefore in particular possible for there to be substantially no gap between the extruder head and the calibration device. Since measurement occurs in the calibration device, in particular starting from its center, when the extruded strand passes through the calibration device, geometry is substantially determined directly after extrusion and thus, on the one hand, at an early point in time favorable for controlling, or respectively regulating. On the other hand, the tubular strand in the calibration device already has a geometry lying close to its final geometry so that the related measured values can be reliably used as a basis for control, or respectively regulation. A significantly more precise conclusion about the outer diameter, wall thickness and any deviations in shape is possible in comparison to the aforementioned prior art.

It would also be conceivable in principle to perform the measurement according to the invention in a cooling section following the calibration device in which for example cooling liquid such as water is applied to the strand from the outside. Given the measurement according to the invention from the inside, the coolant applied from the outside is not a problem in contrast to the aforementioned prior art. In particular, measuring through a water film is unnecessary which is problematic due to the lack of penetrability, particularly with the employed millimeter wave radiation. On the other hand in the region of the cooling section, the strand is already mostly dimensionally stable so that the measured geometric parameters lie even closer to their final values. The reliability of the measured values can thus be further increased.

According to another embodiment, at least one radiation reflector can be provided outside of the tubular strand that reflects electromagnetic radiation directed from the at least one radiation source to the inner side of the tubular strand, wherein the refractive index of the strand material is determined from this reflected radiation. The refractive index can in principle be determined as described in WO 2016/139155 A1. Accordingly, the refractive index of the strand material can be deduced from a comparison of the runtime of the electromagnetic radiation between the radiation transmitter and the reflector without a tubular strand, and the runtime between the radiation transmitter and reflector with a tubular strand, given a known wall thickness. To accomplish this, it is only necessary to irradiate a wall of the strand. Only the position of the fixed reflector and the radiation transmitter must be known. Two fixed opposing reflectors could also be provided whose distance from each other is known. It is also possible to determine the refractive index material at various points over the circumference. With a corresponding calibration, the average temperature of the strand material can be deduced therefrom at the measuring site. Whereas for example a PIR sensor measures the surface temperature of the strand, the temperature in the strand wall could be ascertained in this way.

According to another embodiment, the at least one radiation reflector can be formed by a metal calibration sleeve of the calibration device. As already explained, the calibration device generally has a metal calibration sleeve against which the tubular strand is pressed, for example by means of a vacuum. In a particularly easy manner, this calibration sleeve can simultaneously be used as a reflector for determining the refractive index. Positioning and holding an additional reflector can be omitted.

According to another embodiment, a plurality of radiation transmitters arranged laterally offset, and/or a plurality of radiation receivers arranged laterally offset can be provided. Particularly when the strand material is still flowable, so-called sagging can occur, wherein the inner surface of the strand deviates from the given circular cylindrical shape. Depending on the deviation in shape, oblique surfaces can arise that can cause the radiation reflected by the surface to not return to the radiation receiver. To reduce, or respectively prevent signal loss in such a case, a plurality of radiation transmitters and/or radiation receivers can be arranged next to each other according to the aforementioned embodiment. For example, when at least three transceivers are arranged next to each other, the radiation of one of the transceivers reflected by an oblique surface can be received by one of the other transceivers and thereby taken into account in the measuring result. It would be possible for the transceivers arranged next to each other to each operate independently, or for them to be synchronized so that a transceiver can receive and evaluate the incoming signal of another transceiver. It can also be provided for the synchronization of the transceiver pairs to be adaptable in a suitable manner, such as dynamically or jointly switchable depending on the nature of the signal.

The method according to the invention can be carried out by the device according to the invention. The device according to the invention can be configured to carry out the method according to the invention.

BRIEF DESCRIPTION OF THE DRAWINGS

Exemplary embodiments of the invention are explained in greater detail below based on figures. Schematically.

The same reference numbers refer to the same objects in the figures unless indicated otherwise.

DETAILED DESCRIPTION OF THE INVENTION

Figure 1:
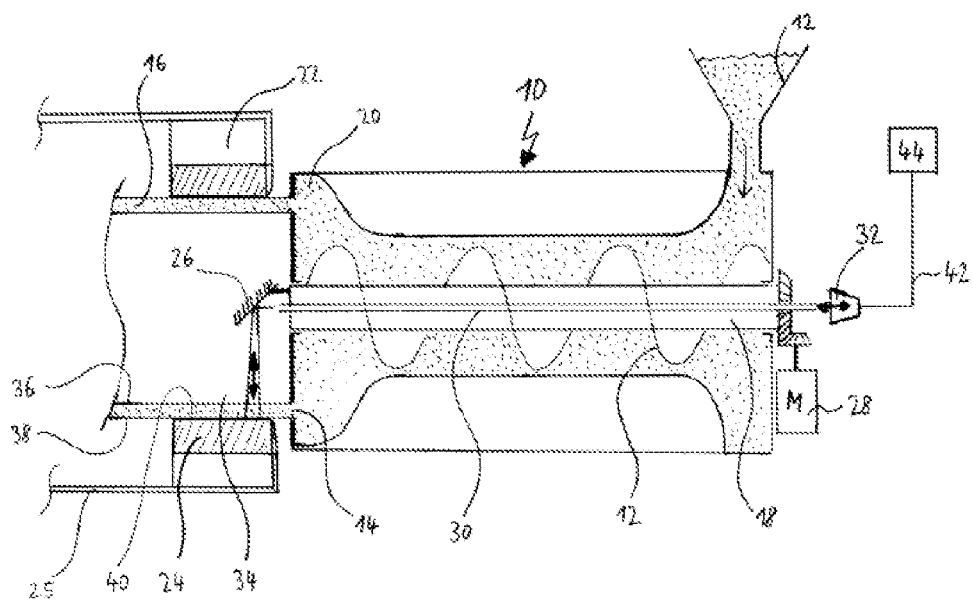
FIG. 1 illustrates a cross-sectional view of an embodiment of an extrusion apparatus with an embodiment of a device for measuring a tubular strand.

FIG. 1 shows an extrusion device 10 for extruding a tubular strand. In a manner known per se, the extrusion device 10 possesses a supply 12 for supplying the plastic material to be processed. The plasticized plastic material is extruded by an extruder screw 12 out of an annular gap 14 into a tubular strand 16. A rotationally driven central shaft 18 runs within the extruder screw 12. In the shown example, a calibration device 22 directly adjoins the extruder head 20 and has a metal calibration sleeve 24 against which the extruded strand 16 is pressed by means of a vacuum. A cooling tube 25 of a cooling section adjoins the calibration sleeve.

In the example shown in FIG. 1, a mirror 26 is arranged in the interior of the extruded strand 16 and substantially directly after the extruder head 20 and thus in the calibration device 22. The mirror 26 is connected to the shaft 18 that in turn is rotatably driven by a motor 28. Consequently, the mirror 26 is also rotated about the longitudinal axis of the tubular strand 16. Moreover, a hollow conductor 30 also runs in the shaft 18 and directs electromagnetic radiation emitted by a transceiver 32 which in the shown example comprises a radiation source and a radiation receiver, preferably terahertz radiation within a frequency range of 10 GHz to 3000 GHz, more preferably within a frequency range of 20 GHz to 1000 GHz, to the mirror 26 that deflects this radiation by 90° to the inner surface of the strand 16 as illustrated in FIG. 1 by the reference number 34. On the one hand, the electromagnetic radiation is directed by the inner surface 36 of the extruded strand back to the mirror 26, and therefrom via the hollow conductor 30 back to the transceiver 32. An additional radiation component enters into the extruded strand 16 and is reflected by the boundary surface between the outer side 38 of the strand 16 and inner surface 40 of the calibration sleeve 24, and is directed by the mirror 26 and the hollow conductor 30 back to the transceiver 32.

The measured values received by the transceiver 32 are transmitted through a line 42 to an evaluation apparatus 44. The evaluation apparatus 44 ascertains the outer diameter, and/or the wall thickness, and/or any deviations in shape of the extruded strand 16, for example on the basis of runtime measurements from the measured values. Moreover, the refractive index of the strand material can also be determined in the above-explained manner using the radiation reflected back at the boundary surface to the metal calibration sleeve 24. Given the rotation of the mirror 26, the explained measurement can be distributed over the circumference of the tubular strand 16 for a plurality of measuring regions. On the basis of the ascertained measured values, the evaluation apparatus 44 that can thus also simultaneously represent a control and/or regulating apparatus, can control and/or regulate the extrusion device.

Figure 2:
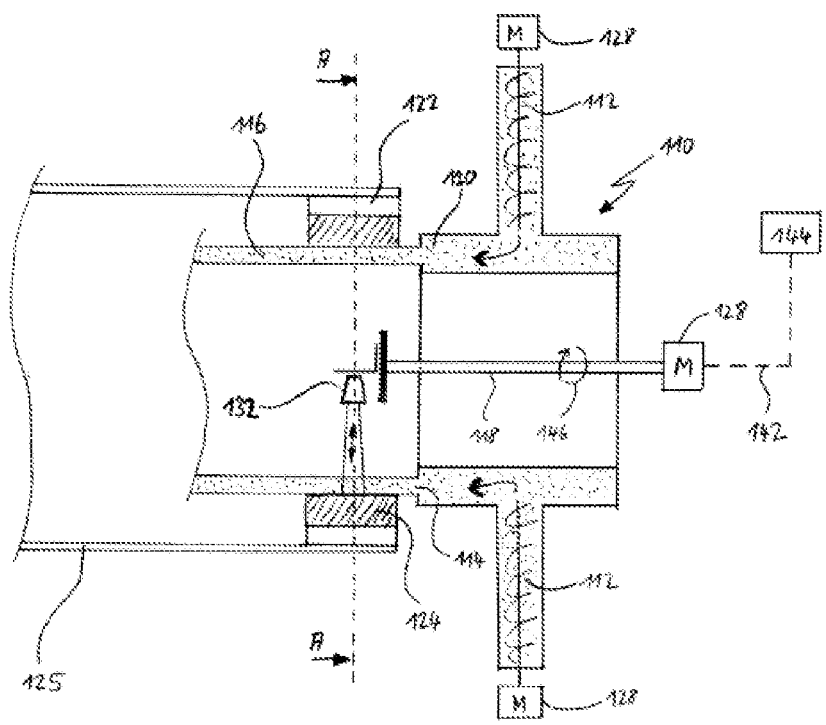
FIG. 2 illustrates a cross-sectional view of another embodiment of and extruder with an embodiment of the device for measuring a tubular strand.

Another exemplary embodiment is shown in FIG. 2 that largely corresponds to the exemplary embodiment according to FIG. 1. In contrast to the exemplary embodiment in FIG. 1, an extrusion device 110 is shown in FIG. 2 that possesses two extruder screws 112 running perpendicular to the longitudinal axis of the annular gap 114. The extruder screws 112 are each rotatably driven by a motor 128. The supplied material is in turn discharged through the annular gap 114 to form the tubular strand 116. Directly after the extrusion device 110, a calibration device 122 is then provided with a metal calibration sleeve 124. A cooling tube 125 of a cooling section is also shown. The extruded tubular strand 116 in FIG. 2 can possess a greater diameter than the tubular strand 16 shown in FIG. 1. Correspondingly, there is more space in the interior of the strand 116 in the exemplary embodiment in FIG. 2. Consequently, a transceiver 132 is arranged in the interior of the strand in this exemplary embodiment. By means of another motor 128 as indicated in FIG. 2 by the arrow 146, the transceiver 132 is rotatably driven by a shaft 118 guided through the extruder head 120. The transceiver 132 can for example be connected by slip ring contacts to an external electrical supply, not shown in greater detail. Through these slip ring contacts, the measured values of the transceiver 132 can if desired also be transmitted to the evaluation apparatus 144 as illustrated by the dashed line 142.

Figure 4:
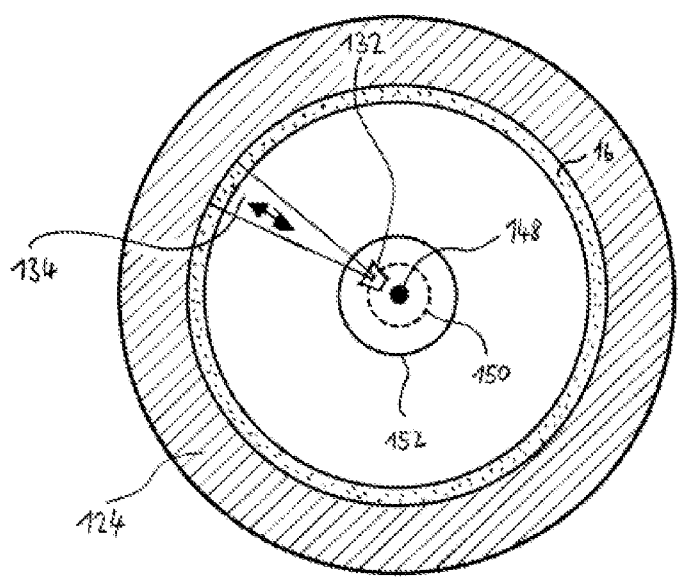
FIG. 4 illustrates a cross-sectional view along the line A-A in FIG. 2.

The rotating transceiver 132 records measured values in principle in the same manner as described with respect to FIG. 1 so that the evaluation apparatus 144 can on this basis determine in particular the outer diameter, the wall thickness, and any deviations in shape of the tubular strand 116. In turn, the extrusion device 110 can be regulated and/or controlled on this basis. It would also be conceivable in principle to likewise arrange the rotary drive in the interior of the tubular strand 116. FIG. 4 illustrates the radiation emitted by the transceiver 132 and reflected back with reference number 134. The center of rotation 148 and the circular path 150 of the transceiver are also shown in FIG. 4. A housing of the measuring head with the transceiver 132 is illustrated with reference number 152.

Figure 3:
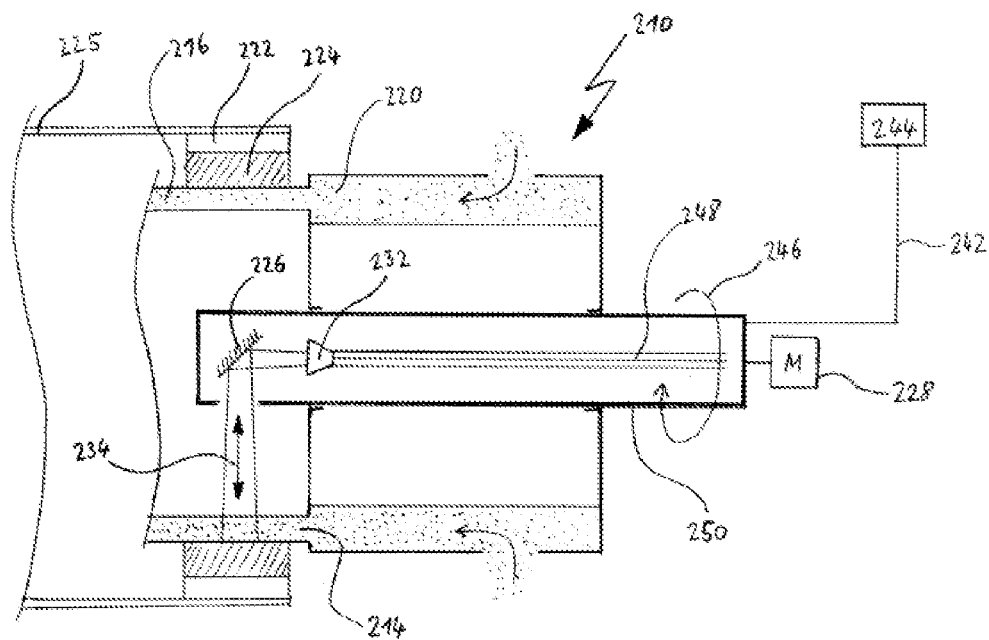
FIG. 3 illustrates an embodiment of an extrusion apparatus including a third embodiment of the device for measuring a tubular strand.

FIG. 3 shows another exemplary embodiment that again largely corresponds to the above-explained exemplary embodiments. The extrusion device 210 shown in FIG. 3 in turn discharges plasticized plastic material supplied by extruder screws (not shown in greater detail) through an annular gap 214 into a tubular strand 216. In turn, a calibration device 222 with a metal calibration sleeve 224 substantially directly adjoins the extruder head 220, and the strand 216 is for example pressed against it with a vacuum. Reference number 225 indicates a cooling tube of a cooling section. In the shown example in the interior of the strand, a mirror 226 is in turn located within the calibration device 222 that deflects electromagnetic radiation by 90° to the inner surface of the strand 216 that is emitted by a transceiver 232 arranged in the extruder head 220 as illustrated at 234. By a motor shown in FIG. 3 at reference number 228, the transceiver 232 is rotated together with the mirror 226 about the longitudinal axis of the tubular strand 216 as illustrated by the arrow 246. A supply line 248 serves to electrically supply the transceiver, and to supply with a coolant such as a cooling liquid.

Moreover, measured values recorded by the transceiver 232 can be supplied via the supply line 248 via a line 242 to an evaluation apparatus 244. The recording of the measured values, the evaluation by the evaluation apparatus 244, and the controlling and/or regulating of the extrusion device 210 based thereupon corresponds in the exemplary embodiment shown in FIG. 3 to the aforementioned exemplary embodiments. In the exemplary embodiment according to FIG. 3, the mirror 226 and the transceiver 232 are located within a housing 250 that can be used for measuring as a plug-in in the extruder head 220. By removing the housing 250, the measuring device can be removed easily if desired.

REFERENCE NUMBERS 10, 110, 210 Extrusion device
12 Supply
12, 112 Extruder screw
14, 114, 214 Annular gap
16, 116, 216 Tubular strand
18, 118 Shaft
20, 120, 220 Extruder head
22, 122, 222 Calibration device
24, 124, 224 Calibration sleeve
25, 125, 225 Cooling tube
26, 226 Mirror
28, 128, 228 Motor
30 Hollow conductor
32, 132, 232 Transceiver 34, 234 Radiation
36 Inner surface of the strand
38 Outer side of the strand
40 Inner surface of the calibration sleeve
42, 142, 242 Line
44, 144, 244 Evaluation apparatus
146,246 Arrows
148 Center of rotation
150 Circular path
152 Housing
248 Supply line
250 Housing

The invention claimed is:

1. A method for measuring a portion of a tubular strand exiting from an extrusion device, the method comprising:
   directing electromagnetic radiation from an inside of the tubular strand to an inner side of a tubular strand, wherein the electromagnetic radiation is directed to several measuring regions distributed over the inner side of the tubular strand, wherein the electromagnetic radiation is directed to the inner side of the tubular strand by at least one radiation transmitter positioned in an interior of the tubular strand and rotating about a longitudinal axis of the tubular strand, wherein the electromagnet radiation is radiated from at least one radiation source within a frequency range from 1 GHz to 6000 GHz;
   reflecting the electromagnetic radiation off of the tubular strand;
   receiving the electromagnetic radiation reflected from the tubular strand by at least one radiation receiver; and
   determining a value for at least one of a diameter, a wall thickness, and a deviation in shape of the tubular strand from the received electromagnetic radiation.

2. The method according to claim 1, wherein the extrusion device is configured to be controlled based on the determined value.

3. The method according to claim 1, wherein at least one of the at least one radiation source and the at least one radiation receiver is arranged in an interior of the tubular strand.

4. The method according to claim 3, wherein at least one of the at least one radiation source and the at least one radiation receiver is supplied with at least one of electrical energy, data, and a coolant through at least one supply line running out of an extruder head of the extrusion device.

5. The method according to claim 1, wherein at least one of the at least one radiation source and the at least one radiation receiver is arranged outside of the tubular strand, wherein radiation emitted by the at least one radiation source is directed through at least one radiation conductor into an interior of the tubular strand, and wherein the radiation reflected by the tubular strand is directed through at least one radiation conductor out of the interior of the tubular strand to the at least one radiation receiver.

6. The method according to claim 5, wherein the at least one radiation conductor is directed out of an extruder head of the extrusion device into the interior of the tubular strand.

7. The method according to claim 1, wherein the electromagnetic radiation is directed to the inner side of the tubular strand starting from a longitudinal axis of the tubular strand.

8. The method according to claim 1, wherein the electromagnetic radiation is directed to the inner side of the tubular strand starting perpendicular to a longitudinal axis of the tubular strand.

9. The method according to claim 1, wherein the at least one radiation transmitter is the at least one radiation source.

10. The method according to claim 1, wherein the at least one radiation transmitter is at least one mirror irradiated by the at least one radiation source and rotating about the longitudinal axis of the tubular strand.

11. The method according to claim 1, wherein a temperature of the tubular strand is measured at least one measuring region on an inner circumference of the tubular strand.

12. The method according to claim 1, wherein the measured portion of the tubular strand is located in a calibration device following the extrusion device during measurement.

13. The method according claim 1, wherein at least one radiation reflector is provided outside of the tubular strand and is configured to reflect electromagnetic radiation directed from the at least one radiation source to the inner side of the tubular strand, and wherein a refractive index of material forming the tubular strand is determined from the reflected radiation.

14. The method according to claim 13, wherein the at least one radiation reflector is formed by a metal calibration sleeve.

15. The method according to claim 1, further comprising at least one of a plurality of radiation transmitters arranged laterally offset to each other and a plurality of radiation receivers arranged laterally offset to each other.

16. A device for measuring a tubular strand exiting from an extrusion device, the device comprising:
   at least one radiation source configured to emit electromagnetic radiation from an inside of the tubular strand and directed toward an inner side of the tubular strand, wherein the at least one radiation source is arranged such that the electromagnetic radiation is directed to several measuring regions distributed over the inner side of the tubular strand, and wherein the electromagnet radiation comprises a frequency range of 1 GHz to 6000 GHz;
   at least one radiation receiver configured to receive the electromagnetic radiation reflected by the tubular strand;
   an evaluation apparatus configured to determine a value of at least one of a diameter, a wall thickness, and a deviation in shape of the tubular strand from the received electromagnetic radiation;
   and
   at least one radiation transmitter positioned in an interior of the tubular strand and configured to rotate about a longitudinal axis of the tubular strand, wherein the at least one radiation transmitter is configured to direct the electromagnetic radiation to the inner side of the tubular strand.

17. The device according to claim 16, further comprising a control device configured to control the extrusion device based on the determined value.

18. The device according to claim 16, wherein at least one of the at least one radiation source and the at least one radiation receiver is arranged in an interior of the tubular strand.

19. The device according to claim 18, further comprising at least one supply line running out of an extruder head of the extrusion device to at least one of the at least one radiation source and the at least one radiation receiver, wherein the at least one supply line is configured to carry at least one of electrical energy, data, and a coolant.

20. The device according to claim 16, wherein at least one of the at least one radiation source and the at least one radiation receiver is arranged outside of the tubular strand.

21. The device according to claim 20, further comprising at least one radiation conductor configured to direct radiation emitted by the at least one radiation source into an interior of the tubular strand, wherein the radiation reflected by the tubular strand is directed out of the interior of the tubular strand to the at least one radiation receiver.

22. The device according to claim 21, wherein the at least one radiation conductor is directed out of an extruder head of the extrusion device into the interior of the tubular strand.

23. The device according to claim 16, wherein the at least one radiation source is positioned such that the electromagnetic radiation is directed to the inner side of the tubular strand starting from a longitudinal axis of the tubular strand.

24. The device according to claim 16, wherein the at least one radiation source is positioned such that the electromagnetic radiation is directed perpendicular to a longitudinal axis of the tubular strand.

25. The device according to claim 16, wherein the at least one radiation transmitter is the at least one radiation source.

26. The device according to claim 16, wherein the at least one radiation transmitter is a mirror irradiated by the at least one radiation source and configured to rotate about a longitudinal axis of the tubular strand.

27. The device according to claim 16, further comprising a temperature sensor configured to measure a temperature of the tubular strand at least one measuring region on the inner side of the tubular strand.

* * * * *